United States Patent
DiGiovanni et al.

(10) Patent No.: US 6,899,470 B2
(45) Date of Patent: May 31, 2005

(54) SYSTEMS AND METHODS FOR FABRICATING LOW-LOSS, HIGH-STRENGTH OPTICAL FIBER TRANSMISSION LINES

(75) Inventors: David John DiGiovanni, Montclair, NJ (US); Torben E. Veng, Roskilde (DK)

(73) Assignee: Fitel USA Corp., Norcross, GA (US)

( * ) Notice: Subject to any disclaimer, the term of this patent is extended or adjusted under 35 U.S.C. 154(b) by 197 days.

(21) Appl. No.: 10/197,192

(22) Filed: Jul. 17, 2002

(65) Prior Publication Data

US 2004/0013374 A1 Jan. 22, 2004

(51) Int. Cl.⁷ .............................................. G02B 6/255
(52) U.S. Cl. ............................ 385/96; 385/99; 385/95; 385/97; 385/123; 385/124; 385/125; 385/126
(58) Field of Search .............................. 385/96, 99, 95, 385/97, 123–126

(56) References Cited

U.S. PATENT DOCUMENTS

| | | | |
|---|---|---|---|
| 4,604,119 A | * | 8/1986 | Kuhl et al. .................... 65/407 |
| 4,689,065 A | | 8/1987 | Krause |
| 4,958,905 A | | 9/1990 | Tynes et al. |

FOREIGN PATENT DOCUMENTS

| | | |
|---|---|---|
| DE | 3138587 A1 | 5/1982 |
| DE | 4235924 A1 | 5/1994 |
| EP | 0150095 A2 | 7/1985 |
| EP | 0505044 A2 | 9/1992 |
| EP | 0831347 A2 | 3/1998 |
| EP | 1202090 A1 | 5/2002 |
| JP | 61044728 | 3/1986 |

* cited by examiner

Primary Examiner—Anthony Dinkins
Assistant Examiner—Jinhee Lee
(74) Attorney, Agent, or Firm—Daniel Kim, Esq.

(57) ABSTRACT

Systems and techniques are described for fabricating a low-loss, high-strength optical transmission line. In one described technique, a first fiber is spliced to a second fiber at a splice point. The spliced fibers are loaded into a heat treatment station, where a gas torch flame is used to thermally treat a splice region including the splice point, with the thermal treatment reducing splice loss between the first and second fibers. While heating the splice region, a dry gas is purged around the torch flame during the heat treatment process to avoid water at the surface of the spliced fibers. According to further described techniques, a purging gas is fed to the torch flame to purge dust particles from the flame, and after the heat treatment has been completed, the torch flame is used to restore the glass surface of the spliced fibers. Additionally described are torch assemblies for fabricating low-loss, high-strength optical fiber transmission lines.

7 Claims, 12 Drawing Sheets

FIG. 20
AVERAGE SPLICE STRENGTH VS. OXYGEN FLOW

LOSS AND STRENGTH FOR ULTRA WAVE SLA TO IDF SPLICES AFTER HEAT TREATMENT

| TRIAL NO: | SPLICE LOSS @ 1550 nm (db): | STRENGTH (kpsi): |
|---|---|---|
| #1 | 0.48 | 422 |
| #2 | 0.17 | 197 |
| #3 | 0.22 | 303 |
| #4 | 0.18 | 283 |
| #5 | 0.19 | 202 |
| #6 | 0.22 | 341 |
| #7 | 0.19 | 258 |
| #8 | 0.20 | 271 |
| #9 | 0.31 | 298 |
| #10 | 0.21 | 349 |
| #11 | 0.22 | 242 |
| #12 | 0.22 | 169 |

SYSTEMS AND METHODS FOR FABRICATING LOW-LOSS, HIGH-STRENGTH OPTICAL FIBER TRANSMISSION LINES

BACKGROUND OF THE INVENTION

1. Field of the Invention

The present invention relates generally to improvements to techniques used to splice optical fiber, and more particularly to advantageous aspects of systems and methods for fabricating low-loss, high-strength optical fiber transmission lines.

2. Description of the Prior Art

A new class of optical fibers has recently been developed known as inverse dispersion fibers (IDFs), including dispersion-compensating fibers (DCFs), which have a steeply sloped, negative dispersion characteristic. One use for DCF is to optimize the dispersion characteristics of already existing optical fiber links fabricated from standard single-mode fibers (SSMF) for operation at a different wavelength. This technique is disclosed in U.S. patent application Ser. No. 09/596,454, filed on Jun. 19, 2000, assigned to the assignee of the present application, which is hereby incorporated by reference in its entirety.

An important parameter for DCF is the excess loss that results when an optical fiber transmission line is fabricated by splicing DCF to other types of fiber, such as SSMF. To obtain a highly negative dispersion, DCF uses a small core with a high refractive index, having a modefield diameter of approximately 5.0 $\mu$m at 1550 nm, compared with the approximately 10.5 $\mu$m modefield diameter of SSMF at 1550 nm. The difference in core diameters results in significant signal loss when a fusion splicing technique is used to connect DCF to SSMF. It is possible to reduce the amount of signal loss by choosing splicing parameters that allow the core of the DCF to diffuse, thereby causing the modefield diameter of the DCF core to taper outwards, resulting in a funneling effect. However, the high concentration of fluorine dopant in typical DCF limits the application of this technique, because the amount and duration of the heat required to produce the funneling effect may result in an undesirable scattered diffusion of the fluorine dopant.

Further, in certain applications, such as in submarine systems, splice strengths of 200 kpsi or more are required. Accordingly, there is a need for improved systems and method for fabricating low-loss, high-strength optical fiber transmission lines.

SUMMARY OF THE INVENTION

The above-described issues and others are addressed by the present invention, aspects of which provide systems and methods for fabricating a low-loss, high-strength optical transmission line. In a method according to an aspect of the invention, a first fiber is spliced to a second fiber at a splice point. The spliced fibers are loaded into a heat treatment station, where a gas torch flame is used to thermally treat a splice region including the splice point, the thermal treatment reducing splice loss between the first and second fibers. While heating the splice region, a dry gas is purged around the torch flame during the heat treatment process to avoid water at the surface of the spliced fibers. According to further aspects of the invention, a purging gas is fed to the torch flame to purge dust particles from the flame, and after the heat treatment has been completed, the torch flame is used to restore the glass surface of the spliced fibers. Additional aspects of the invention provide torch assemblies for fabricating low-loss, high-strength optical fiber transmission lines.

Additional features and advantages of the present invention will become apparent by reference to the following detailed description and accompanying drawings.

DETAILED DESCRIPTION

Aspects of the present invention provide systems and techniques for fabricating a low-loss, high-strength optical transmission line from an inverse dispersion fiber (IDF), such as a dispersion-compensating fiber (DCF), and a second type of fiber, such as a standard single mode fiber (SSMF). It will be appreciated that the systems and techniques described herein may be applied to other types of fibers and fiber dopants without departing from the spirit of the invention. Further, the techniques described below may be practiced singly, or in combination with each other.

Figure 1:
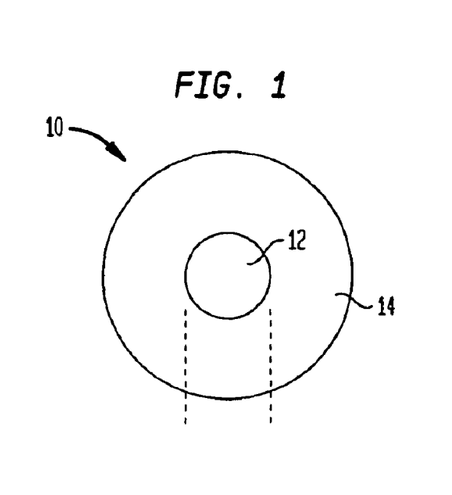
FIG. 1 is a radial cross section diagram of a sample of standard single-mode fiber (SSMF), not drawn to scale.
Figure 2:
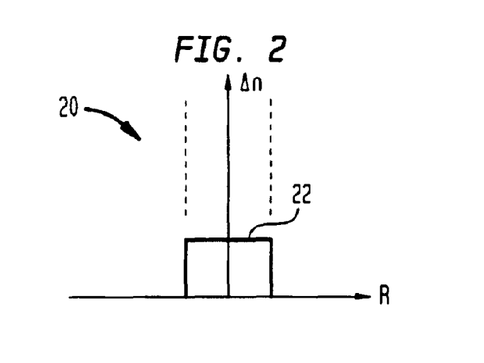
FIG. 2 is a graph illustrating a refractive index (RI) profile for the SSMF shown in FIG. 1.

FIG. 1 shows a cross section of an exemplary length of SSMF 10. SSMF is typically fabricated from silica ($SiO_2$). The SSMF 10 includes a germanium-doped core 12 and an undoped outer cladding layer 14 surrounding the core 12. FIG. 2 shows the refractive index (RI) profile 20 for the SSMF 10. As shown in FIG. 2, the SSMF RI profile 20 includes a central plateau 22 corresponding to the SSMF core 12.

Figure 3:
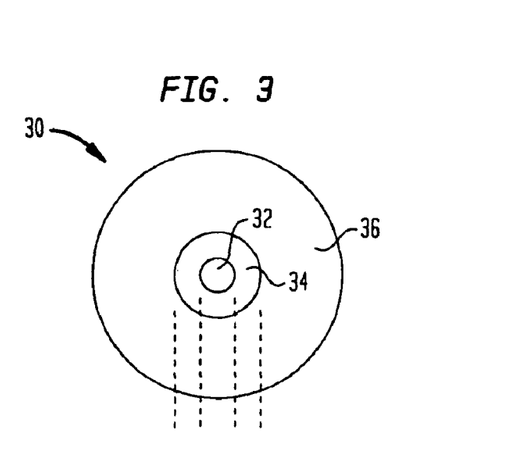
FIG. 3 is a radial cross section diagram of a sample of dispersion compensating fiber (DCF), not drawn to scale.
Figure 4:
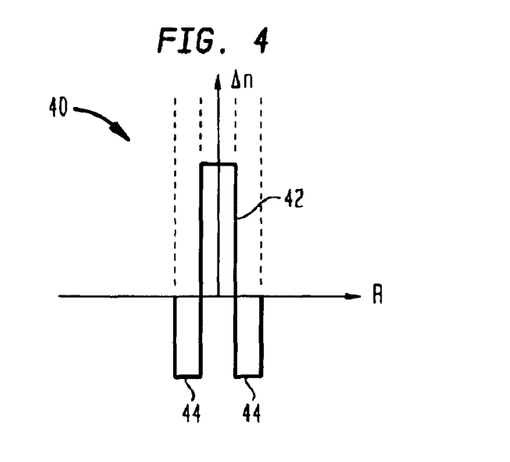
FIG. 4 is a graph illustrating an RI profile for the DCF shown in FIG. 3.

FIG. 2 shows a cross section of an exemplary length of DCF 30. DCF is also typically fabricated from silica. The DCF 30 shown in FIG. 2 includes a germanium-doped core 32, a fluorine-doped first cladding layer 34, and an undoped outer cladding layer 36. FIG. 4 shows the RI profile 40 for the DCF 10. As shown in FIG. 4, the DCF RI profile 40 includes a central spike 42 corresponding to the DCF core 32, and a pair of deep trenches 44 on either side of the spike 42, corresponding to the fluorine-doped cladding layer 34. In order to achieve the spike 42 and trenches 44 in the RI profile 40, a heavy concentration of germanium dopant is used in the DCF core 32, and a heavy concentration of fluorine dopant is used in the DCF first cladding layer 34. It should be noted that certain DCF fibers may have different RI profiles and concentrations of dopants from the present example. However, it will be appreciated from the present description that the invention is also applicable to these other DCF fibers.

Figure 5:
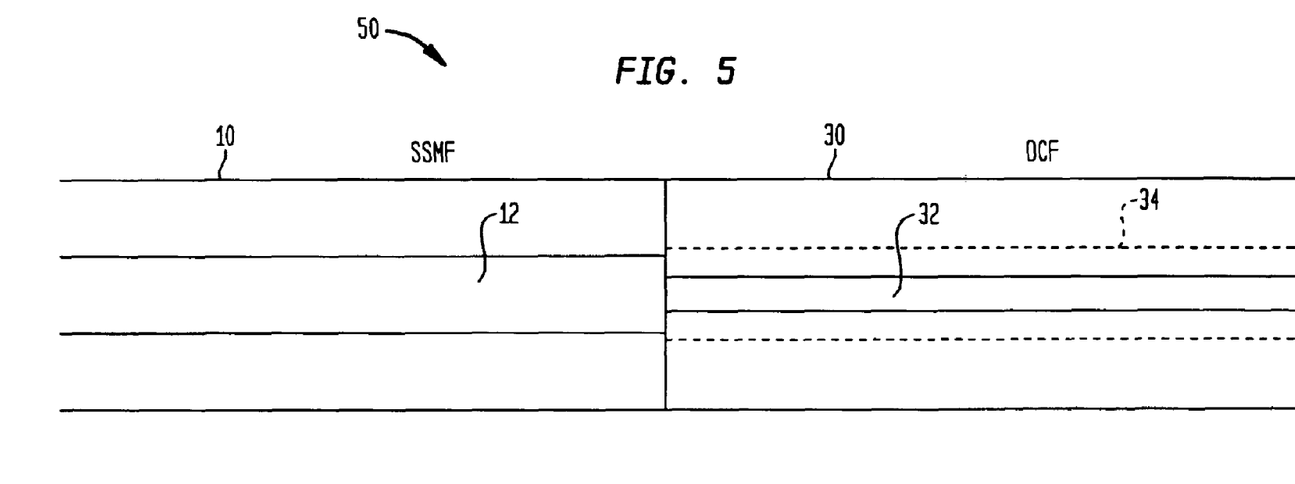
FIG. 5 is a longitudinal cross section of an optical transmission line fabricated from the SSMF shown in FIG. 1 and the DCF shown in FIG. 3.

FIG. 5 is a longitudinal cross section diagram of an optical transmission line 50 that has been fabricated by connecting the SSMF 10 and DCF 30 to each other. It will be seen from FIG. 5 that the SSMF core 12 is significantly larger than the DCF core 32. In addition, it will be seen from FIGS. 2 and 4 that the RI profiles 20 and 40 for the two fibers have a significantly different shape. These differences in diameter and shape result in a significant amount of splice loss.

It is possible to reduce splice loss resulting from core diameter mismatch by thermally diffusing the DCF core 32 to more closely match the size of the SSMF core 12. However, thermal expansion of the DCF core 32 is problematic because of the fluorine-doped cladding layer 34. Fluorine begins to diffuse at a lower temperature than germanium. Thus, applying heat to the DCF 30 to thermally expand its core 32 may cause an uneven diffusion of fluorine, contributing to splice loss.

Accordingly, a technique has been developed, in which a thermal treatment station is used to thermally expand the DCF core 32, while also producing a smooth diffusion of fluorine dopant. This technique is more fully described in U.S. patent application Ser. No. 09/778,444 entitled System and Methods for low loss splicing of optical fibers having a high concentration of fluorine to other types of optical fiber, filed on Feb. 7, 2001, and assigned to the assignee of the present application, which is incorporated herein in its entirety.

Figure 6:
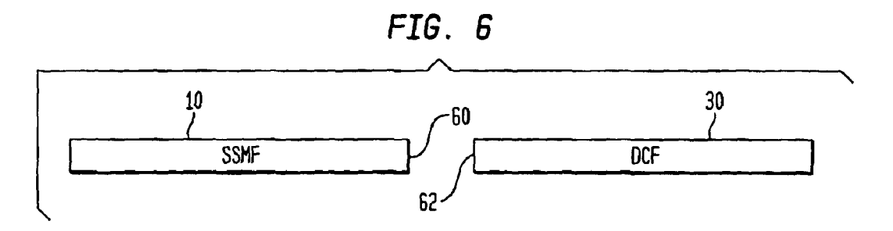
FIGS. 6 through 9 show a series of diagrams illustrating a technique for reducing splice loss in an optical transmission line fabricated from the SSMF shown in FIG. 1 and the DCF shown in FIG. 3.
Figure 7:
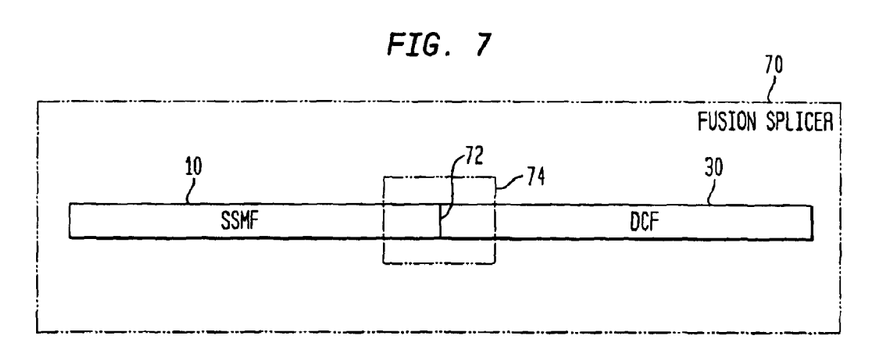

FIGS. 6 through 9 are a series of diagrams illustrating one aspect of a thermal treatment technique. In FIG. 6, the SSMF 10 and the DCF 30 are prepared for splicing. This preparation may include, for example, cleaving and stripping the fiber ends 60 and 62. In FIG. 7, the fibers 10 and 30 have been loaded into a fusion splicer 70, with the fiber ends 60 and 62 aligned and abutting each other at a splice point 72. An arc current is used to create a hot zone 74 that raises the splice point 72 to a temperature that is sufficient to cause the fiber ends to become fused together at the splice point 72. A typical splice temperature is approximately 2,000° C. In the present example, splicing parameters are chosen that minimize dopant diffusion in the two fibers 10 and 30.

Figure 8:
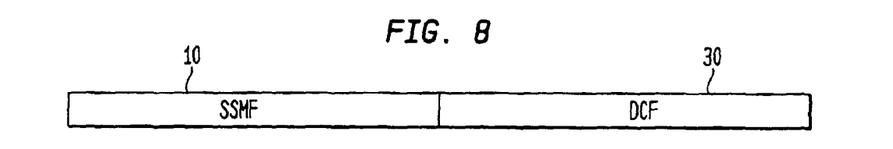
Figure 9:
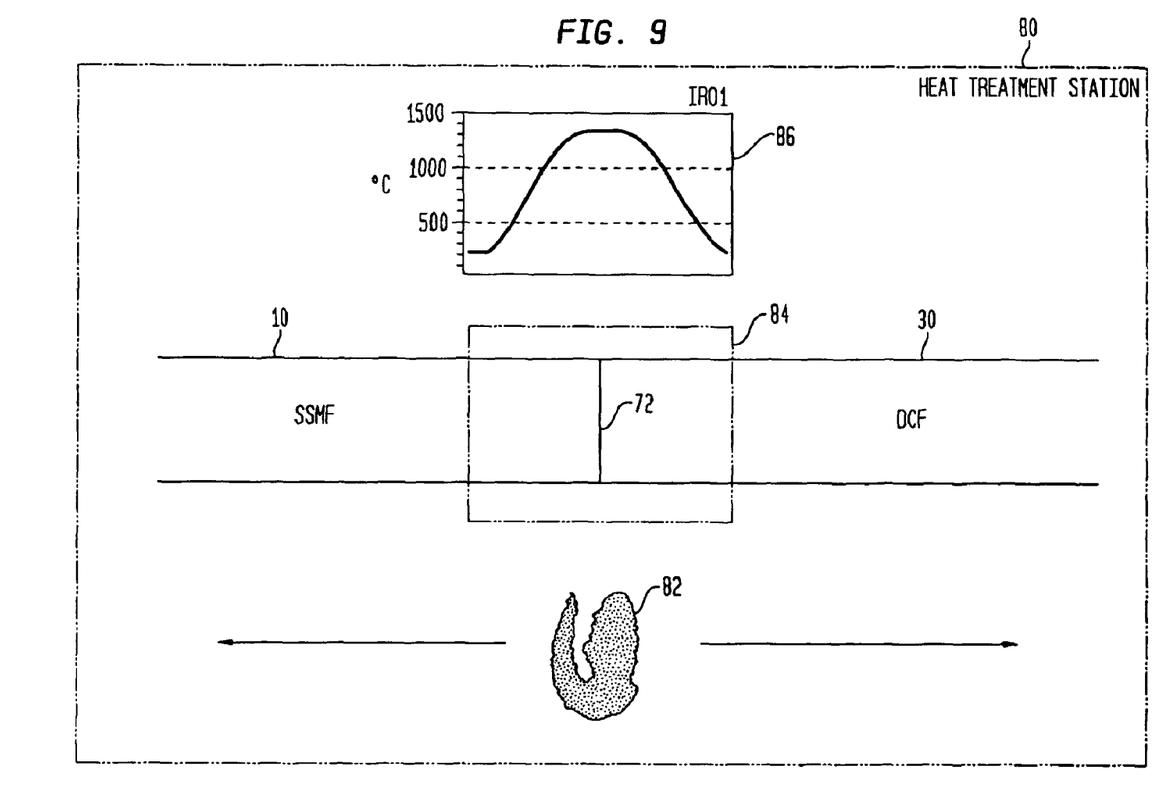

In FIG. 8, the spliced fibers 10 and 30 have been removed from the fusion splicer 70. At this point, the spliced fibers 10 and 30 exhibit a significant amount of splice loss because of modefield mismatch. In FIG. 9, the spliced fibers 10 arid 30 have been loaded into a heat treatment station 80, in which a gas torch flame 82 is used to apply heat to a splice zone 84. According to an aspect of the invention, the gas torch flame 82 is scannable in both directions along the length of the SSMF and DCF 10 and 30. In addition, as described below, the intensity of the gas torch flame 82 and the size of the splice zone 84 may be controlled by regulating the gas flow to the torch 82.

The splice zone 84 is heated in accordance with a heating profile 86, which causes a tapered diffusion of the dopants in the SSMF 10 and DCF 30 in the splice zone 84. As shown in the heating profile 86, the splice point 72 is heated to approximately 1,300° C. The temperature of the splice zone 84 tapers off on each side of the splice point 72.

Figure 10:
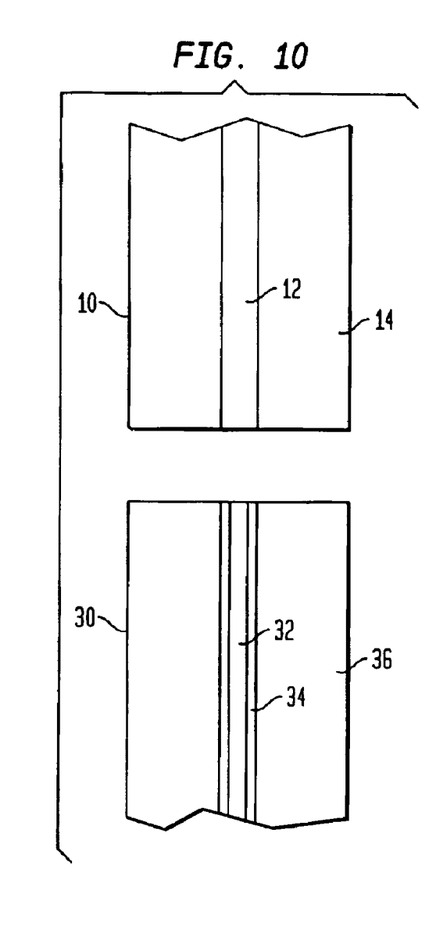
FIGS. 10 through 12 show a series of longitudinal cross section diagrams illustrating changes in the doped components of the SSMF and DCF during the technique illustrated in FIGS. 6 through 9.
Figure 11:
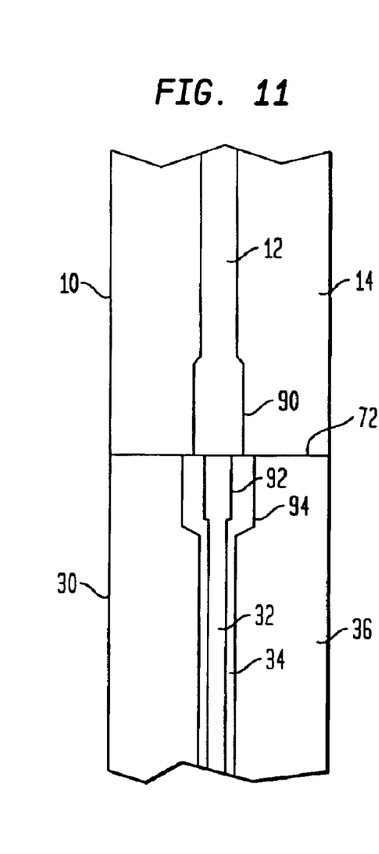
Figure 12:
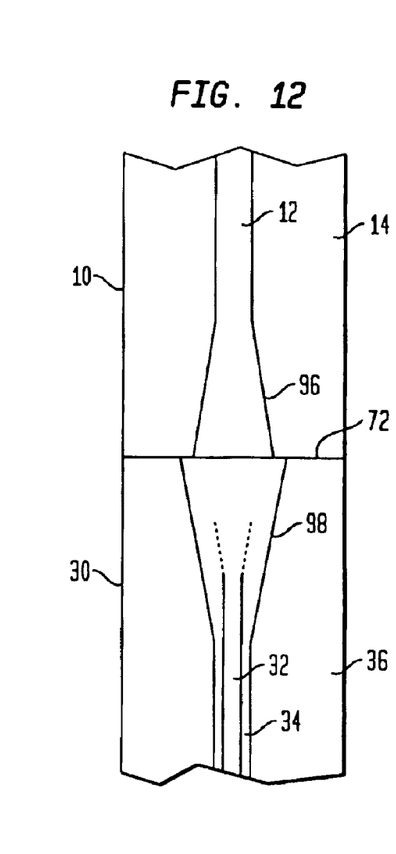

FIGS. 10 through 12 are a series of longitudinal cross section diagrams illustrating the effect of the heat treatment on the dopants in the SSMF 10 and DCF 30. FIG. 10 shows the fibers 10 and 30 prior to splicing. As described above, the SSMF 10 includes a germanium-doped core 12 and an undoped cladding 14. The DCF 30 includes a germanium-doped core 32, a first cladding layer 34, which is heavily doped with fluorine, and an undoped overclad 36.

In FIG. 11, a fusion splicer has been used to splice together the SSMF 10 and the DCF 30 at the splice point 72. The heat of the fusion splicing process has caused some diffusion in the SSMF and DCF dopants. As shown in FIG. 11, the SSMF core 12 includes a slightly expanded portion 90. Similarly, the DCF core 32 and first cladding region 34 also have slightly expanded portions 92 and 94.

As described above, the spliced fibers are then loaded into a heat treatment station. FIG. 12 shows the results of the heat treatment process. It will be seen that the expanded portion of the SSMF core 90 has been shaped into a smooth, tapered pathway 96. The expanded portions of the DCF core and cladding 92 and 94 have blended together, and also form a smooth, tapered pathway 98.

Figure 13:
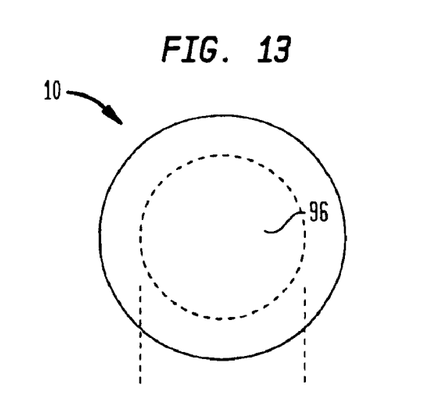
FIG. 13 shows a radial cross section diagram of the SSMF shown in FIG. 12 at the splice point.
Figure 14:
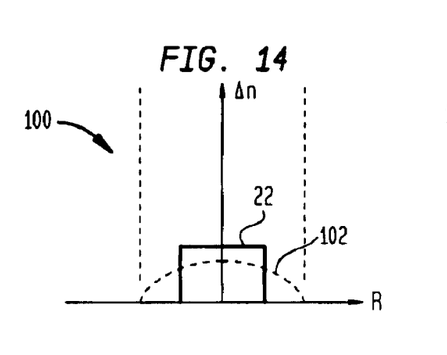
FIG. 14 shows an RI profile of the SSMF shown in FIG. 13.

FIG. 13 shows a radial cross section diagram of the heat-treated SSMF 10 at the splice point 72. The germanium-doped core 12 shown in FIG. 1 has been expanded to the larger diameter, diffused core 96 shown in FIG. 13. FIG. 14 is a graph 100 showing the pre-treatment RI profile 22, and also showing, using a broken line, the post-treatment RI profile 102. As shown in FIG. 14, the post-treatment RI profile does not have square edges, but is now curved, because of the diffusion of germanium dopant. In the splice zone 84, the SSMF 10 makes a smooth transition between the pre-treatment RI profile 22 and the post-treatment RI profile 102. The transition between the two RI profiles 22 and 102 is substantially adiabatic, that is, without significant loss.

Figure 15:
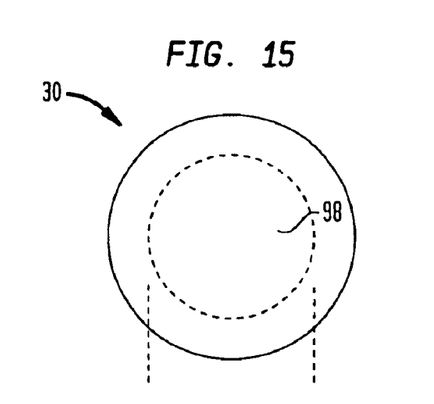
FIG. 15 shows a radial cross section diagram of the DCF shown in FIG. 12 at the splice point.
Figure 16:
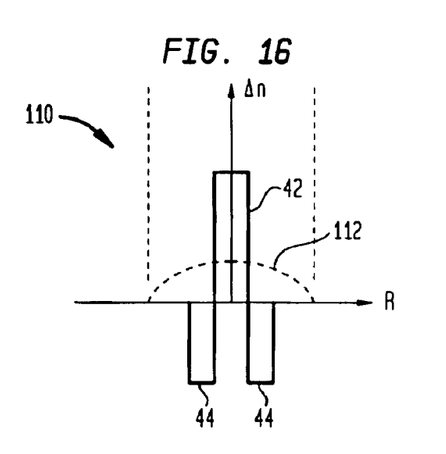
FIG. 16 shows an RI profile of the DCF shown in FIG. 15.

FIG. 15 shows a radial cross section diagram of the heat-treated DCF 30 at the splice point 72. The DCF germanium-doped core 32 and fluorine-doped first cladding layer 34 shown in FIG. 2 have been blended and expanded into the germanium-fluorine core 98 shown in FIG. 15. FIG. 16 is a graph 110 showing the DCF pre-treatment RI profile 42 and 44 and the post-treatment RI profile 112. It will be seen in FIG. 16 that the rectangular peak 42 and negative trenches 44 have been blended into a single, curved profile 112. In the splice zone 84, the DCF makes a smooth, substantially adiabatic transition between the pre-treatment RI profile 42 and 44 and the post-treatment RI profile 112.

It will be seen from FIGS. 13 through 16 that, at the splice point 72, the SSMF and DCF cores 96 and 98 have similar sizes and RI profiles. This similarity reduces the amount of splice loss between the two fibers. It is possible to achieve further splice loss reduction after the heat treatment by scanning the flame 82 along the length of the splice region 84 in the direction of signal propagation. This post-treatment scanning causes a further smoothing of the modefield and dopant transition. In addition, bending loss may be reduced by ramping torch gas flow downward when the spliced fibers are loaded into, and removed from, the thermal treatment station.

It should be noted that the above-described technique may be modified without departing from the spirit of the invention. For example, it would be possible to use the fusion splicer 70 to perform the expansion of the DCF core 32. The heat treatment station would be then used to cause a smooth diffusion of the fluorine-doped cladding layer 34 to reduce splice loss.

Figure 17:
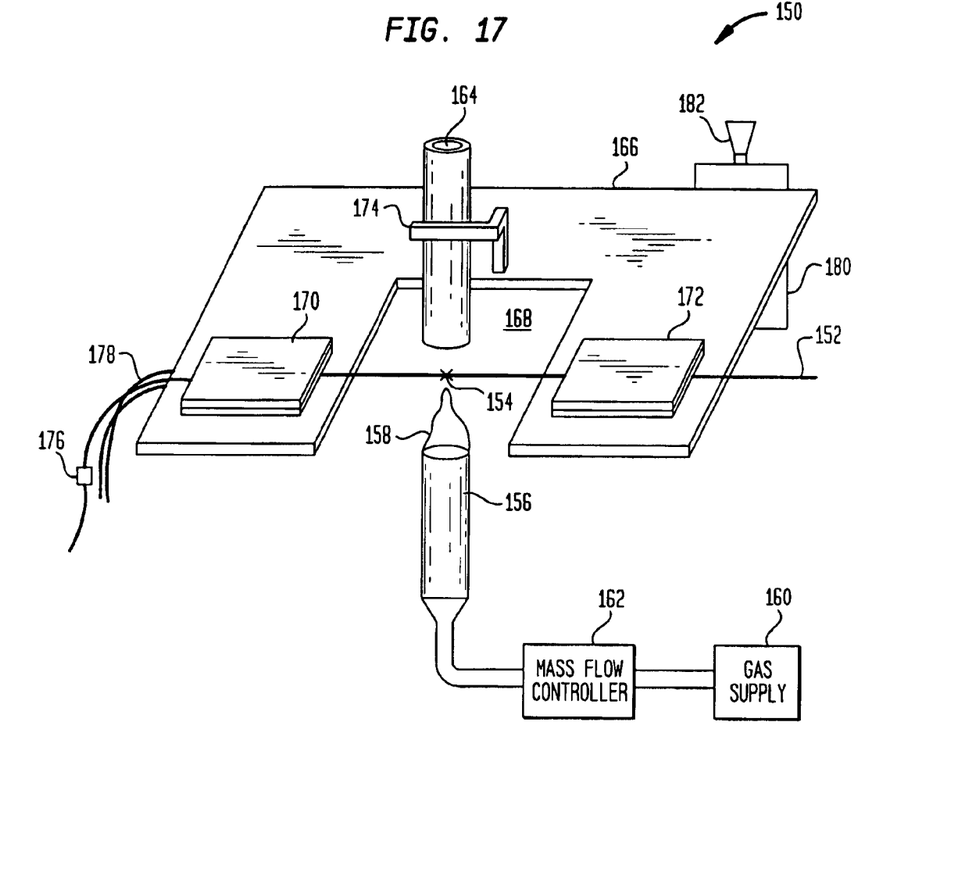
FIG. 17 shows a perspective view of an example of a thermal treatment station suitable for use in practicing the techniques described herein.

FIG. 17 shows a perspective view of a heat treatment station 150 that is suitable for use in practicing the techniques described herein. The heat treatment station 150 shown in FIG. 17 is further described in U.S. patent application Ser. No. 09/778,444. It will be appreciated, however, that the techniques described herein may also be practiced with other heat treatment stations, including other heat treatment stations shown and described in U.S. patent application Ser. No. 10/197,184, without departing from the spirit of the invention.

The heat treatment station 150 shown in FIG. 17 is used to apply heat to a spliced optical fiber line 152. The splice point 154 of the optical fiber 152 is positioned over a heating device 156, which in the present example is implemented using a gas torch with a flame 158 that is fed by a gas supply 160. Other heating elements may suitably be used without departing from the spirit of the invention. In order to precisely regulate the torch 156, the gas supply 160 is provided with a mass flow controller 162. A chimney 164 is positioned over the torch 156 to stabilize the flame 158 during heating. The fiber 152 and chimney 164 are held in position by a plate 166 that includes a cutaway portion 168 for exposing the splice point 154. The fiber 152 is held in position on the plate 166 by first and second clamps 170 and 172 located on either side of the cutaway portion 168, and the chimney 164 is held in position on the plate 166 by an arm 174 that grips the chimney 164.

A slight tension is maintained in the fiber 152 during the heating process by a weight 176 that is removably attached to one end of the fiber. This tension prevents the fiber 178 from moving relative to the flame 158 during the heating process. Care must be taken to decide the right weight to avoid stretching the fiber when it is heated. In the present example, a weight of 0.7 g is used. The first clamp 170 holds the fiber 172 sufficiently loosely to allow the tension in the fiber 152 to be controlled in this manner and functions as a fiber guide. To prevent bending damage to the fiber 152, a curved guide 178 is provided, upon which the weighted portion of the fiber 152 rests during the heating process.

According to a further aspect of the invention, it has been found that it is desirable, in certain situations, to apply an additional controlled tension to the spliced fiber during the thermal treatment process. This additional tension may be applied by increasing the amount of weight 176 applied to the spliced fiber. Other tensioning mechanisms may also be used.

The plate 166 is movable relative to the torch 156 using a translation stage 180 upon which the plate 166 is mounted. A position reading device 182 provides precise information as to location of the plate 166. When the spliced fiber 152 is initially mounted into the thermal treatment station 150, the plate 166 is positioned far above the flame 158. After mounting, the splice point 154 is moved into the flame using the translation stage 180. For repeatable results, the position of the translation stage 166 is monitored using the position reading device 182. Once an optimal position for the splice point 154 with respect to the flame 158 is determined, this position is used for subsequent thermal treatments.

The torch 156 is fabricated from a quartz tube having an inner diameter of approximately 4 mm. Since the temperature necessary to diffuse the fluorine is estimated to be approximately 1,200–1,300° C., a gas such as propane or hydrogen without an additional oxygen supply can be used. The mass flow controller 162 is used to keep the gas flow at the right value. Typical flows are about 10 ml/min (for propane). Again, this value must be optimized for the particular fibers used.

The splice loss is monitored while the splice 154 is in the flame 158. When the minimum splice loss is reached, in approximately 10 minutes, the translator 180 is used to remove the splice 154 from the flame 158. The splice 154 can now be removed from the thermal treatment station 150. The thermal treatment station 150 shown in FIG. 18 requires only 1 cm of bare fiber 152 at the splice point 154.

Further aspects of the invention provide systems and methods for increasing the strength of the heat-treated splice region. According to one aspect of the invention, a dry gas is purged around the gas torch flame in the thermal treatment station to avoid water at the surface of the spliced fibers during the heat treatment. It has been found that a suitable moisture content for the dry gas is less than 100 ppm by weight. According to a further aspect of the invention, dry oxygen is used in the combustion region of the flame.

According to another aspect of the invention, a second gas, such as nitrogen ($N_2$), is purged around the torch to avoid dust particles near the flame. The gas may be filtered, and the flow rate may be optimized for maximum splice strength.

According to a further aspect of the invention, after the heat treatment, the glass surface of the spliced fibers in the splice region is restored by scanning the torch flame along the splice region with appropriate gas flows to improve splice strength. Alternatively, restoration of the glass surface of the spliced fibers in the splice region may also be accomplished by increasing gas flow to the torch for a short time after modefield expansion to cause the heat zone to widen and to reach a sufficiently high temperature.

Aspects of the invention provide systems and methods for increasing the strength of the splice in fibers treated as described above. These systems and methods may be practiced by modifying the thermal treatment station 150 illustrated in FIG. 17, and described above. The systems and methods may also be incorporated into other systems for applying heat to spliced fibers.

Figure 18:
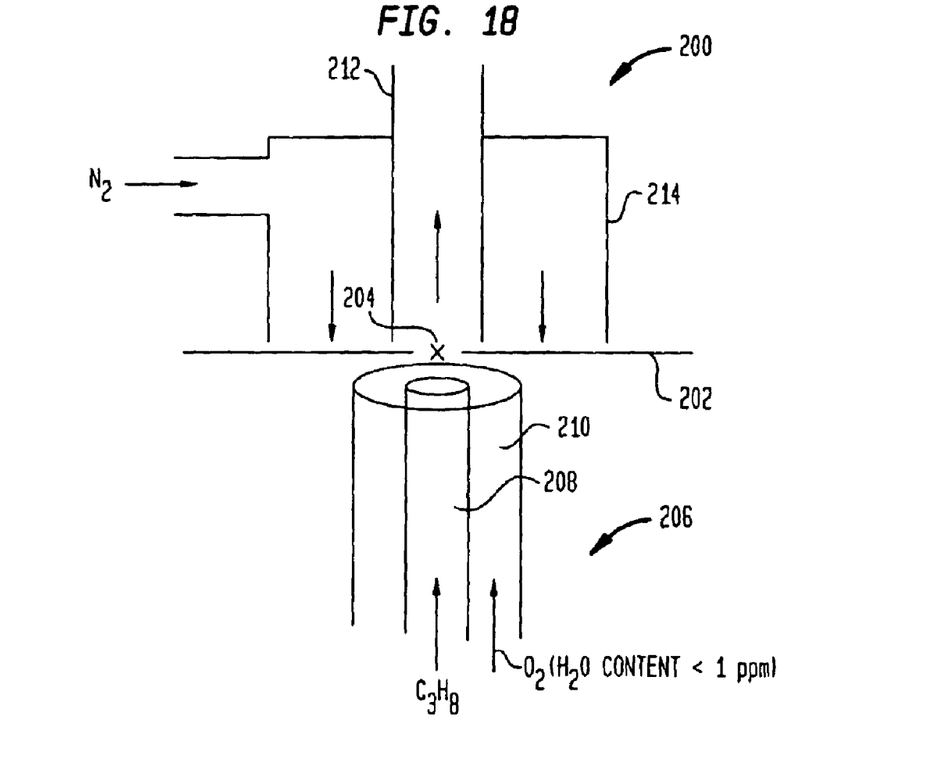
FIG. 18 shows a diagram of a gas torch assembly according to an aspect of the invention.

In one aspect, a dry gas, such as dry oxygen or the like, is fed into the torch flame to remove water at the surface of the spliced fibers. A purging gas is fed around the flame to avoid dust particles near the flame. FIG. 18 shows a diagram of a gas torch assembly 200 according to an aspect of the invention that is used to thermally treat a spliced fiber 202. The fiber's splice point 204 is centered over the flame from a torch 206. The torch 206 includes a coaxial pair of tubes 208 and 210. The inner tube 208 is used to deliver propane, or other suitable flammable gas, to a torch flame (not shown). The outer tube 210 is used to feed a dry gas, such as dry oxygen, into the flame in order to remove water at the surface of the fiber 202. It has been found that a suitable water content for the dry gas is less than 1 ppm. The dry gas serves to remove water at the surface of the spliced fibers during the heat treatment.

The torch assembly 206 includes a chimney 212 over the flame to stabilize the flame and to draw off any airborne residue of the thermal treatment. A purging gas feeding tube 214 surrounds the chimney 212, and delivers a suitable purging gas, such as nitrogen, to purge dust particles proximate to the flame.

It has been found that removing water at the surface of the spliced fibers 202 and purging dust particles proximate to the flame during the heat treatment process increases the strength of the splice region. It should be noted that either of these techniques, singly, also increases the strength of the splice region. Thus, these techniques may be practiced either singly or in combination.

Figure 19:
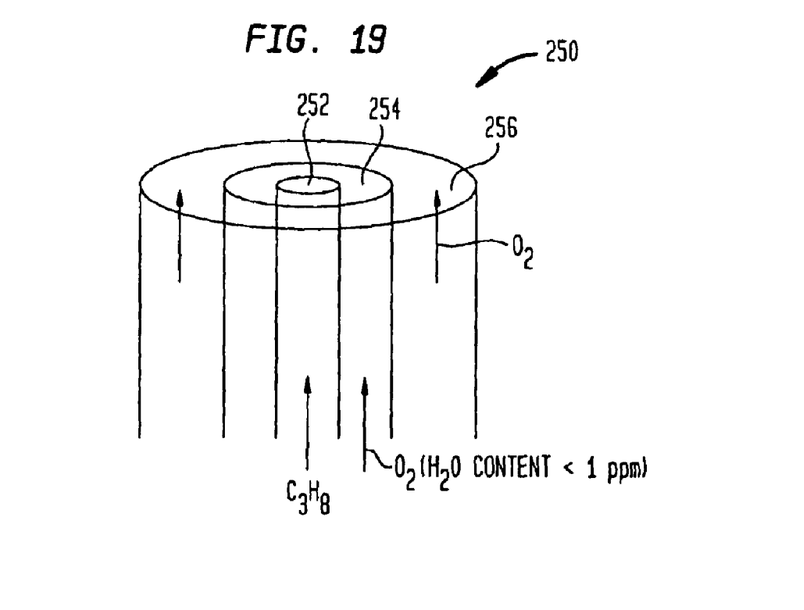
FIG. 19 shows a diagram of a second gas torch assembly according to an aspect of the invention.

FIG. 19 shows another assembly 250 according to a further aspect of the invention. The torch assembly 250 is a "triple torch," which includes three coaxial tubes 252, 254 and 256. The inner tube 252 is used to deliver a suitable flammable gas, such as propane, to the torch flame (not shown). The middle tube 254 is used to deliver a dry gas, such as dry oxygen, to the flame. The outer tube 256 is used to deliver a purging gas, such as plain oxygen, to the flame. Again, the dry gas serves to remove water at the surface of the fiber, and the purging gas serves to purge dust particles proximate to the flame. The torch 250 shown in FIG. 19 may be provided with a chimney (not shown) over its flame to stabilize the flame and to draw off any airborne residue of the thermal treatment.

Figure 20:
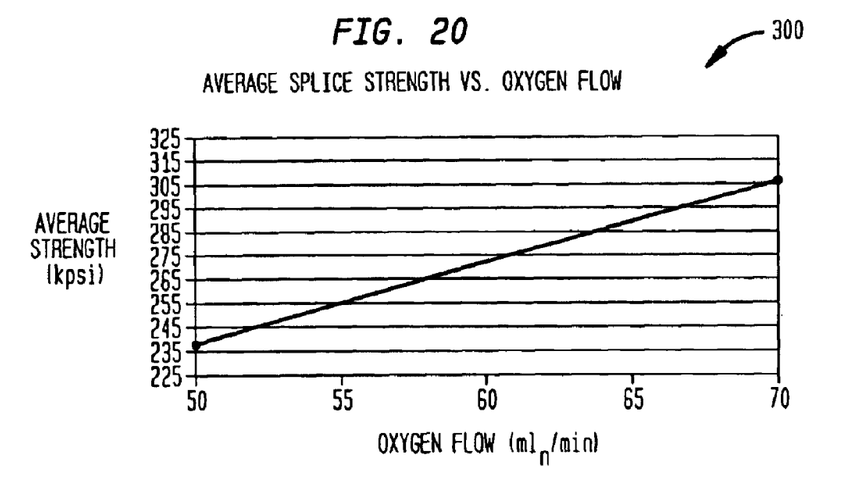
FIG. 20 shows a graph illustrating average splice strength as a function of oxygen flow.

FIG. 20 shows a graph 300 mapping the relationship between oxygen flow and average splice strength when using the torch 200 shown in FIG. 18. From these data, it will be seen that an increase in oxygen flow results in increased splice strength. However, an increased oxygen flow also results in an increased temperature.

As described above, when performing a modefield expansion on an IDF and other DCFs, temperature is a critical parameter. Therefore, it is necessary to select an oxygen/gas flow ratio that results in an acceptable splice loss. Hence, in some cases it might be difficult to obtain a desirable splice loss and sufficient strength at the same time.

A way to overcome this problem is to add an inert gas, such as argon, to the oxygen flow to tailor a sufficiently dry atmosphere, while at the same time maintaining a suitable temperature for modefield conversion.

Figure 21:
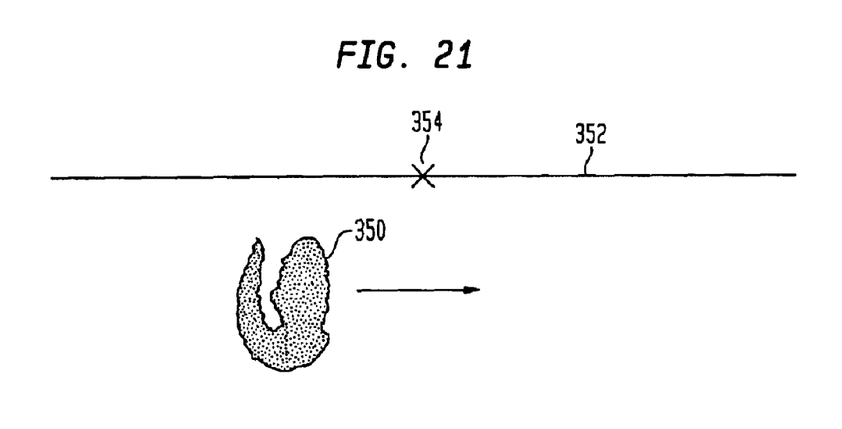
FIG. 21 is a diagram illustrating a heat scanning technique according to an aspect of the invention.

Another solution is to first make the modefield expansion at the correct temperature interval. The expansion typically takes approximately 10–20 minutes. Afterwards, as illustrated in FIG. 21, the flame 350 is scanned along the spliced fibers 352 in the vicinity of the splice point 354 at a temperature optimized for strength for a much shorter time, causing only a minor amount of diffusion. Scanning the flame 350 can also be used for further reducing splice loss by adding the possibility of further tailoring the taper to create a low-loss transition.

Figure 22A:
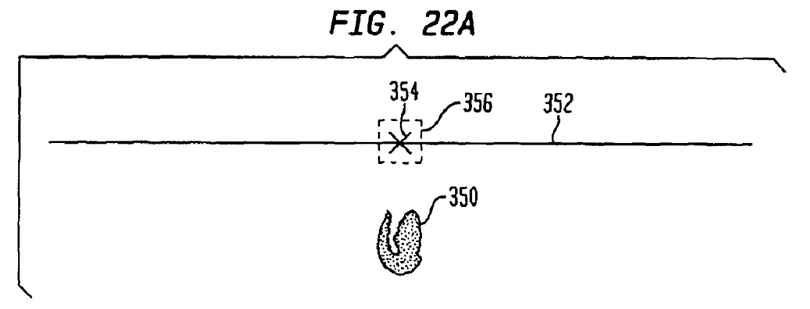
FIGS. 22A–C are a series of diagrams illustrating the use of increased and decreased torch gas flows according to an aspect of the invention.
Figure 22B:
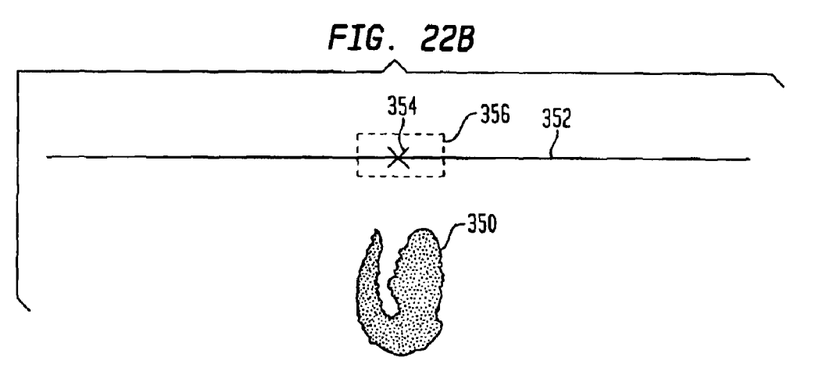
Figure 22C:
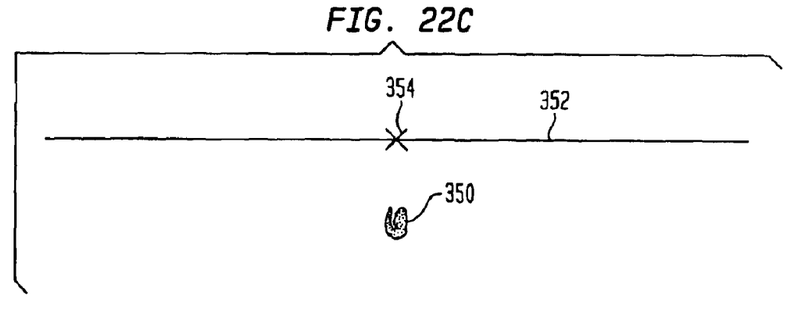

Often it is not even required to scan the flame along the splice to improve strength, simply a final ramping of gas flow is sufficient. FIGS. 22A–C illustrate various levels of flame intensity. FIG. 22A shows the normal gas flow used during thermal treatment, in which the flame 350 is positioned relative to the spliced fibers 352 to create a hot zone 356 around the splice point 354. Ramping the gas flow upwards causes an increase in the size of the flame 350 and an expansion of the width of the hot zone 356, illustrated in FIG. 22B. The hot zone 356 can be expanded so that it covers the whole region that has been heated during a modefield expansion process. Any micro cracks induced by the modefield expansion process can be removed in this way. In the case of DCFs, the removal of micro cracks typically requires a higher temperature compared with the optimal temperature for modefield conversion.

An effect that in some splice trials also has turned out to degrade strength is the bending of the fibers during heating. This bending may occur, for example, during the placement of the splice in the flame or the removal of the heat-treated splice from the flame. One way to prevent this bending from occurring is to apply a slight tension to the fibers, without physical tapering, as the fiber is placed into, or removed from, the flame. The problem can further be reduced by ramping the gas flows in connection with the placement of the fiber in the flame, and the removal of the fiber from the flame. For example, as illustrated in FIG. 22C, the gas flow may be ramped downward so that the flame 350 is far below the splice 354 before the spliced fibers 352 are removed from the setup. In this way the splice 354 experiences no sudden temperature changes that may result in bending.

Figure 23:
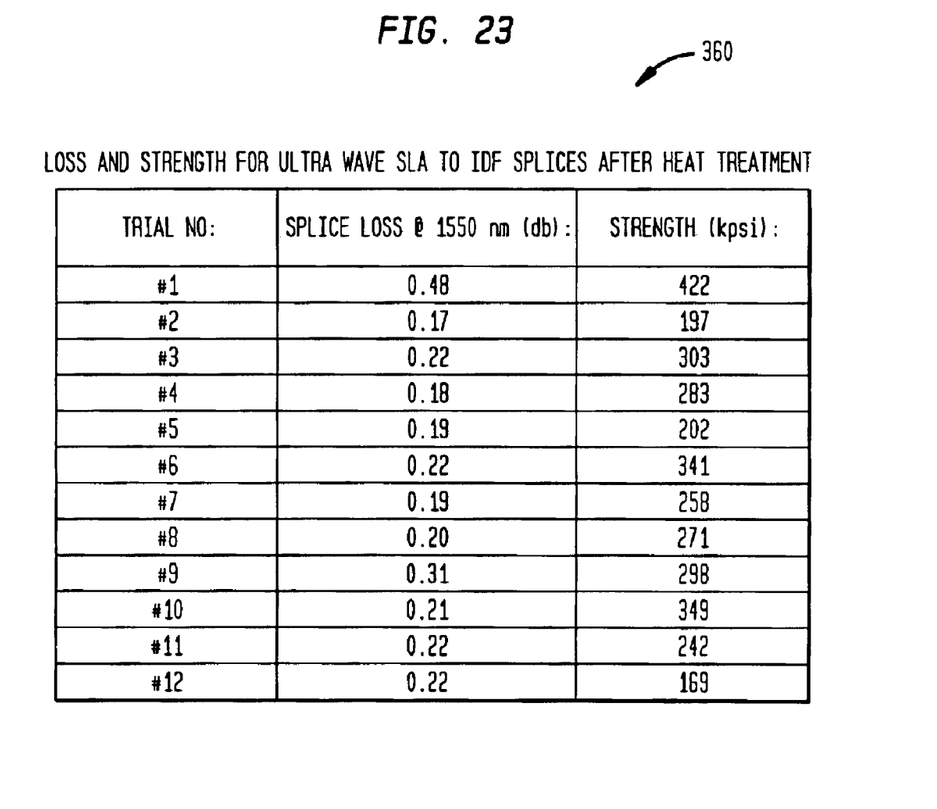
FIG. 23 shows a table setting forth loss and strength values for splices fabricated according to an aspect of the invention.

FIG. 23 is a table 360 setting forth splice loss and strength data after heat treatment for a series of trial splices in which a length of Ultra Wave SLA is spliced to a length of IDF. As shown in the table data, using the techniques described herein, it is possible to achieve splice strengths of over 200 kpsi, and splice losses of 0.22 dB or lower.

Figure 24:
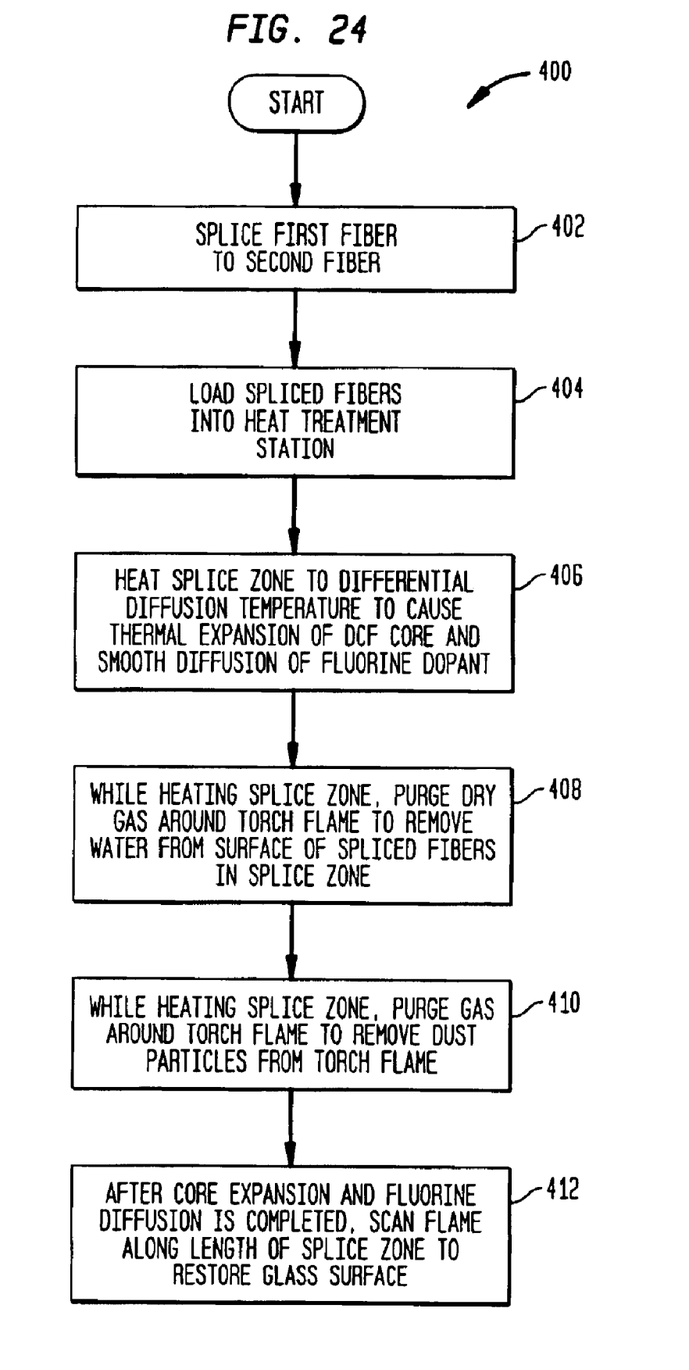
FIG. 24 is a flowchart of a method according to an aspect of the invention.

FIG. 24 is a flowchart of a method 400 according to an aspect of the invention for fabricating an optical transmission line with high strength and low splice loss. In step 402, a fusion splicer is used to splice a first fiber type to a second fiber type. In step 404, the spliced fibers are removed from the fusion splicer and loaded into a thermal treatment station. In step 406, a torch flame in the treatment station is used to heat the splice zone to a differential diffusion temperature to cause a thermal diffusion of the core of the first fiber, and also to cause a smooth diffusion of another dopant in the first fiber, such as fluorine. In step 408, while the splice zone is being heated, dry gas is purged around the torch flame to remove water from the surface of the spliced fibers in the splice zone. In step 410, while the splice zone is being heated, a gas is purged around the torch flame to remove dust particles from the torch flame. In step 412, after the thermal treatment has been completed, the torch flame is canned along the length of the splice zone to restore the glass surface of the spliced fibers.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for fabricating a low-loss, high-strength optical transmission line, comprising:
   (a) splicing a first fiber to a second fiber at a splice point;
   (b) loading the spliced fibers into a heat treatment station;
   (c) using a gas torch flame to thermally treat a splice region including the splice point, the thermal treatment reducing splice loss between the first and second fibers;

(d) while heating the splice region, purging a dry gas around the torch flame during the heat treatment process to avoid water at the surface of the spliced fibers.

2. The method of claim 1, wherein in step (a) a fusion splicer is used to splice the first fiber to the second fiber.

3. The method of claim 1, wherein the dry gas is dry oxygen.

4. The method of claim 3, wherein the dry oxygen has a water content of less than 100 ppm by weight.

5. The method of claim 3, wherein the dry oxygen is used in the combustion region of the flame.

6. The method of claim 3, wherein an inert gas is added to the dry oxygen.

7. The method of claim 6, wherein the inert gas is argon.

* * * * *